United States Patent [19]

Inoue et al.

[11] Patent Number: 5,468,830
[45] Date of Patent: Nov. 21, 1995

[54] PROCESS FOR PREPARING ORGANOPOLYSILOXANE GUM

[75] Inventors: Yoshio Inoue; Susumu Sekiguchi; Minoru Igarashi, all of Annaka, Japan

[73] Assignee: Shin-Etsu Chemical Co. Ltd., Tokyo, Japan

[21] Appl. No.: 189,333

[22] Filed: Jan. 31, 1994

[30] Foreign Application Priority Data

Jan. 29, 1993 [JP] Japan .................................. 5-034211

[51] Int. Cl.$^6$ .................................................. C08G 77/04
[52] U.S. Cl. .................................. 528/26; 528/31; 528/33; 528/34; 528/37; 528/38; 528/41
[58] Field of Search ................................. 528/34, 26, 31, 528/33, 37, 38, 41

[56] References Cited

U.S. PATENT DOCUMENTS 4,673,750  6/1987  Beers et al. ................................ 528/18

*Primary Examiner*—Melvyn I. Marquis
*Assistant Examiner*—Karen A. Dean
*Attorney, Agent, or Firm*—Millen, White, Zelano, & Branigan

[57] ABSTRACT

A siloxane gum is prepared by adding a silane or siloxane having two hydrolyzable groups in a molecule to a silanol-terminated organopolysiloxane in such an amount to give a molar ratio of silanol group/hydrolyzable group of from 0.5 to 3 and effecting condensation polymerization. The resulting organopoly-siloxane has a degree of polymerization of higher than 1,000 and a minimized content of low-molecular weight cyclic siloxanes of less than 5,000 ppm.

18 Claims, No Drawings

PROCESS FOR PREPARING ORGANOPOLYSILOXANE GUM

BACKGROUND OF THE INVENTION

1. Field of the Invention

This invention relates to a process for preparing an organopolysiloxane gum having a high degree of polymerization and a minimized content of low-molecular weight siloxanes.

2. Prior Art

Because of its weatherability, electrical properties, low compression set, heat resistance, low-temperature resistance, and the like, silicone rubber has been utilized in a wide variety of applications covering use in electronic equipment, automobiles, buildings, medical equipment and the food industry. Several exemplary applications are rubber contacts used as rubber contact keys in remote controllers, typewriters, word processors, computer terminals and musical instruments; building gaskets; developing, transfer, charging and paper feeding rolls in copying and printing machines; vibration dampers in audio equipment; and packings for holding compact disks in computers. The demand for silicone rubber is increasing and there is a desire to have silicone rubber having further improved properties.

Such silicone rubber is prepared from a raw material in the form of organopolysiloxane gum having a high degree of polymerization, which is prepared as disclosed in U.S. Pat. No. 2,546,036 by treating a liquid hydroxyl-terminated organosiloxane having a low-molecular weight with polydimethylsiloxane in the presence of sodium hydroxide catalyst. U.S. Pat. No. 2,634,252 also discloses catalysts which are useful in the preparation of siloxane gum from the standpoints of reaction rate, viscosity and quality, for example, potassium hydroxide, potassium silanolate, lithium silanolate, and tetraalkyl-ammonium hydroxide.

When these methods are employed, however, a substantial amount (5 to 10% by weight) of low-molecular weight cyclic siloxanes are left in the siloxane gum resulting from polymerization reaction. These low-molecular weight siloxanes adversely affect silicone rubber products. In the case of rubber contacts, for example, the amount of low-molecular weight siloxanes in a silicone rubber shape is reduced to further improve the durability and reliability of the rubber contact. More particularly, the low-molecular weight siloxane content is reduced by an enhanced heat treatment. In one exemplary method, the rubber contact shape is vulcanized and thereafter, heat treated in an oven at 150° to 250° C. over 2 to 24 hours. Such enhanced heat treatment is disadvantageous from the aspects of labor and cost.

For the same reason, roll materials used in copying machines are required to have reduced low-molecular weight siloxane content. In the case of building gaskets, it is known that the substance which causes staining of the surrounding building gasket is low-molecular weight siloxanes remaining in the siloxane gum of which the gasket is made. Under the circumstances, silicone rubber manufacturers attempted to reduce low-molecular weight siloxanes in starting siloxane gum rather than later removing low-molecular weight siloxanes from molded rubber.

One exemplary method for removing low-molecular weight siloxanes from a siloxane gum is by placing the gum under vacuum at elevated temperatures of 100° to 300° C. since the siloxane gum is highly viscous, however, great amounts of energy and time are required in order to achieve complete removal. Thus this method encounters a practical limit. It was also proposed to dissolve siloxane gum in a solvent such as toluene for extracting low-molecular weight siloxanes although this method added cumbersome steps and was disadvantageous in the industry.

There is a need for a polymerization process of preparing siloxane gum having an extremely low content of low-molecular weight siloxanes.

SUMMARY OF THE INVENTION

An object of the present invention is to provide a process for preparing an organo-polysiloxane gum having a high degree of polymerization and a minimized content of low-molecular weight siloxanes.

The inventors have found that by mixing a silane or siloxane having two hydrolyzable groups in a molecule witch a silanol-terminated organopolysiloxane of formula (1) defined below in such an amount to give a molar ratio of silanol group to hydrolyzable group between 0.5 and 3 and effecting condensation polymerization, there is obtained a siloxane gum having a high degree of polymerization of at least $1 \times 10^3$ and a minimized content of low-molecular weight siloxanes.

In formula (1), $R^1$ and $R^2$ each are a substituted or unsubstituted monovalent hydrocarbon group and letter n is an integer of 2 to 3,000. As seen from the formula, by the term silanol-terminated it is meant that an organopolysiloxane is terminated with a silanol group at each end.

When an organopolysiloxane gum having a high degree of polymerization is prepared by effecting condensation polymerization of an organosiloxane of formula (1) according to a conventional process, low-molecular weight siloxanes of formula (2) wherein m is 3 to 25 (that is, trimer to 25 monomer unit polymer) form as by-products in a total amount of more than 30,000 parts by weight per million parts by weight of the organopolysiloxane gum (ppm). Quite unexpectedly, when a silanol-terminated organopolysiloxane of formula (1) is mixed with a silane or siloxane having two hydrolyzable groups in a molecule in such an amount to give a molar ratio of silanol group/hydrolyzable group between 0.5 and 3 and the mixture is heated to effect condensation polymerization, there is obtained a siloxane gum in which the content of low-molecular weight siloxanes of formula (2) wherein m is 3 to 25 is less than 5,000 ppm. Especially when low-molecular weight siloxanes have been fully removed from the silanol-terminated organosiloxane as the raw material, there can be obtained a siloxane gum having a high degree of polymerization in which the content of low-molecular weight siloxanes of formula (2) wherein m is 3 to 25 is less than 2,000 ppm.

In formula (2), $R^1$ and $R^2$ are as defined above and letter m is an integer of at least 3.

Therefore, the present invention relates to a process for preparing an organopolysiloxane gum by effecting condensation polymerization of a silanol-terminated organosiloxane of formula (1). The present invention is characterized by adding a silane or siloxane having two hydrolyzable groups in a molecule to said organopolysiloxane of formula (1) in such an amount to give a molar ratio of the silanol group in the organopolysiloxane of formula (1) to the hydrolyzable group of from 0.5 to 3 before condensation polymerization is effected. There is obtained an organopolysiloxane having a high degree of polymerization of at least $1\times10^3$ and a total content of low-molecular weight cyclic siloxanes from trimer to 25-monomer-unit polymer of up to 5,000 ppm.

DETAILED DESCRIPTION OF THE INVENTION

The process of the invention starts with a both end silanol-terminated organosiloxane of the general formula (1).

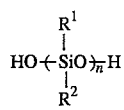

In formula (1), $R^1$ and $R^2$, which may be identical or different, are a substituted or unsubstituted monovalent hydrocarbon group, preferably having 1 to 10 carbon atoms. Examples of the hydrocarbon group include alkyl groups such as methyl, ethyl and propyl groups, alkenyl groups such as vinyl and allyl groups, aryl groups such as phenyl and tolyl groups, aralkyl groups such as phenylethyl group, alkaryl groups, and substituted ones of these groups wherein some or all of the hydrogen atoms are replaced by halogen atoms or cyano groups, such as chloromethyl, trifluoropropyl, cyanoethyl, and α-cyanophenylethyl groups.

Letter n representing a degree of polymerization is an integer of 2 to 3,000. From an economical point of view, n is preferably an integer of 10 to 1,500, more preferably an integer of 50 to 1,000.

The organosiloxane of formula (1) as the raw material used for the preparation of siloxane gum by the process of the invention is desired to have cyclic siloxanes, which do not participate in polymerization, removed therefrom as much as possible by suitable removal means such as stripping in order to reduce the content of low-molecular weight siloxanes in the final siloxane gum. It is especially preferred to use a silanol-terminated organosiloxane of formula (1) obtained by using a cyclic trisiloxane as a raw material and effecting ring-opening polymerization thereof, because the content of low-molecular weight siloxanes is minimized.

According to the present invention, a silane or siloxane having two hydrolyzable groups in a molecule is added upon condensation polymerization of an organosiloxane of formula (1).

The silane or siloxane having two hydrolyzable groups in a molecule is exemplified by those of the following formulae (3) to (5) though not limited thereto. In the formulae, Me is methyl and Et is ethyl.

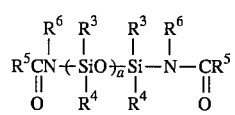

In formula (3), $R^3$, $R^4$, $R^5$, and $R^6$ are independently selected from substituted or unsubstituted monovalent hydrocarbon groups as defined for $R^1$ and $R^2$ and letter a is a positive number of 0 to 100.

Illustrative examples of the silane or siloxane of formula (3) are given below.

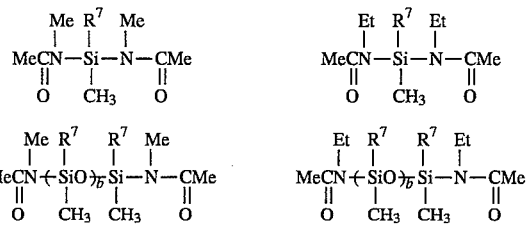

In these formulae, $R^7$ is a methyl, vinyl, trifluoropropyl or phenyl group, and letter b is an integer of 1 to 100.

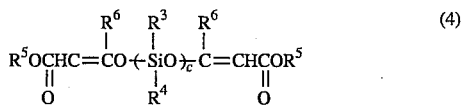

In formula (4), $R^3$, $R^4$, $R^5$, and $R^6$ are independently selected from substituted or unsubstituted monovalent hydrocarbon groups as defined for $R^1$ and $R^2$ and letter c is a positive number of 1 to 100.

Illustrative examples of the silane or siloxane of formula (4) are given below.

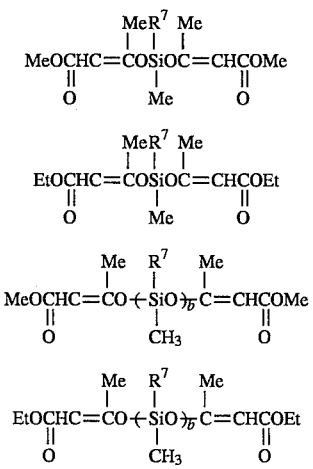

In these formulae, $R^7$ is a methyl, vinyl, trifluoropropyl or phenyl group, and letter b is an integer of 1 to 100.

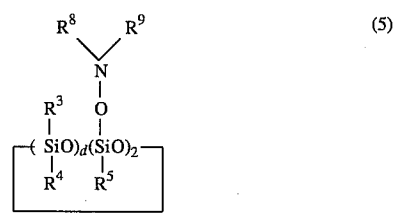

In formula (5), $R^3$, $R^4$, $R^5$, $R^8$, and $R^9$ are independently selected from substituted or unsubstituted monovalent hydrocarbon groups as defined for $R^1$ and $R^2$ and letter d is an integer of 2 to 10.

Illustrative examples of the silane or siloxane of formula (5) are given below.

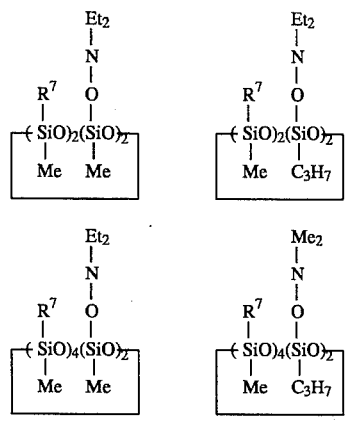

In these formulae, $R^7$ is a methyl, vinyl, trifluoropropyl or phenyl group.

Examples of the silane or siloxane having two hydrolyzable groups which is more effective for suppressing formation of low-molecular weight siloxanes are represented by the following formula (6):

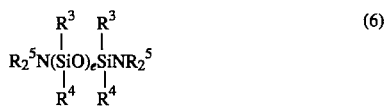

wherein $R^3$, $R^4$, and $R^5$ are independently selected from substituted or unsubstituted monovalent hydrocarbon groups as defined for $R^1$ and $R^2$, and letter e is a positive number of 0 to 1,000.

Illustrative examples of the silane or siloxane of formula (6) are given below.

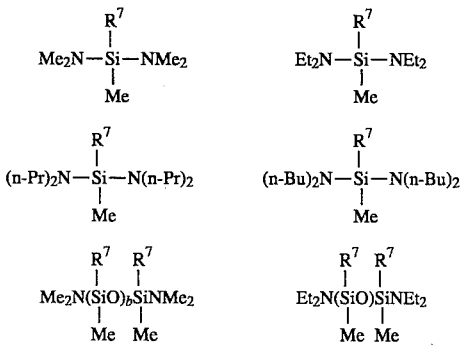

In these formulae, $R^7$ is a methyl, vinyl, trifluoropropyl or phenyl group, Pr is propyl, Bu is butyl, and letter b is an integer of 1 to 100.

It is to be noted that in formula (6) wherein $R^3$, $R^4$, and $R^5$ are substituted or unsubstituted monovalent hydrocarbon groups, $R^5$ is preferably an alkyl group such as a methyl, ethyl and butyl group, more preferably a lower alkyl group such as a methyl and ethyl group. Since the smaller the value of e, the more active becomes the condensation catalyst, those silane or siloxane oligomers of formula (6) wherein letter e is 0 to 10 are preferred.

Other useful examples are silanes and siloxanes containing two acetoxy groups in a molecule.

In effecting condensation polymerization of an organosiloxane of formula (1) in the presence of a silane or siloxane having two hydrolyzable groups in a molecule, the amount of the silane or siloxane added is such that the molar ratio of the silanol group in the organosiloxane to the hydrolyzable group ranges from 0.5 to 3. At a molar ratio of less than 0.5, the resulting siloxane gum has an insufficient degree of polymerization whereas at a molar ratio of higher than 3, the silane or siloxane provides less contribution to condensation polymerization. The amount of silanol group per mol of hydrolyzable group is preferably from 0.8 to 1.5 mol. More preferably mixing is such that the molar ratio of silanol group/hydrolyzable group is approximately 1.

The condensation polymerization temperature is from room temperature to 200° C. at which a siloxane gum is obtained in several hours to several days. If the silane or siloxane having two hydrolyzable groups in a molecule is volatile, condensation is first effected at room temperature to some extent and the system is then heated to a temperature of 150° to 180° C. at which condensation polymerization takes place until a siloxane gum having an intended molecular weight is obtained.

In this way, there is obtained a siloxane gum having a degree of polymerization of at least $1\times10^3$, especially at least $5\times10^3$. The content of low-molecular weight siloxanes of formula (2) wherein m is 3 to 25 is up to 5,000 ppm, and up to 2,000 ppm particularly when a silanol having a reduced content of low-molecular weight siloxanes is used as a raw material.

EXAMPLE

Examples of the present invention are given below by way of illustration and not by way of limitation.

Example 1

A separable flask was charged with 500 grams of a silanol-terminated dimethylpoly-siloxane (average degree of polymerization $n=7\times10^2$, viscosity: $6.4\times10^3$ centistokes at 25° C., silanol content: 0.0195 mol, low-molecular weight siloxanes $D_3$–$D_{25}$: 654 ppm) and 1.42 grams of bis(dimethylamino)dimethylsilane (dimethyl-amino content 0.0195 mol). The mixture was agitated for one hour at room temperature, heated to 180° C., and agitated at the temperature for a further 2 hours for condensation polymerization. There was obtained a siloxane gum having a degree of polymerization and a content of low-molecular weight siloxanes ($D_3$–$D_{25}$) as reported in Table 1.

Example 2

A siloxane gum was prepared as in Example 1 using 500 grams of a silanol-terminated dimethylpolysiloxane (average degree of polymerization $n=6.9\times10^2$, viscosity: $6.2\times10^3$ centistokes at 25° C., silanol content: 0.0190 mol, low-molecular weight siloxanes $D_3$–$D_{25}$: 329 ppm) and 1.92 grams of bis(diethylamino)-dimethylsilane (diethylamino content 0.0190 mol). The results are reported in Table 1.

Example 3

A siloxane gum was prepared as in Example 1 using 500 grams of a silanol-terminated dimethylpolysiloxane (average degree of polymerization $n=1\times10$, viscosity: 15 centistokes at 25° C., silanol content: 0.9 mol, low-molecular weight siloxanes $D_3$–$D_{25}$: 1800 ppm) and 90.9 grams of bis(diethylamino)dimethylsilane (diethylamino content 0.9 mol). The results are reported in Table 1.

Example 4

A siloxane gum was prepared as in Example 1 using 500 grams of a silanol-terminated dimethylpolysiloxane (average degree of polymerization $n=7\times10^2$, viscosity: $6.4\times10^3$ centistokes at 25° C., silanol content: 0.195 mol, low-molecular weight siloxanes $D_3$–$D_{25}$: 1800 ppm) and 21.1 grams of bis(methylethylamido)dimethylsilane (methylethylamido content 0,195 mol). The results are reported in Table 1.

Example 5

A siloxane gum was prepared as in Example 1 using 500 grams of a silanol-terminated dimethylpolysiloxane (average degree of polymerization $n=7\times10^2$, viscosity: $6.4\times10^3$ centistokes at 25° C., silanol content: 0,195 mol, low-molecular weight siloxanes $D_3$–$D_{25}$: 1800 ppm) and 37.4 grams of bis(diethylaminoxy)hexa-methyltetracyclosiloxane (diethylaminoxy content 0,195 mol). The results are reported in Table 1.

Comparative Example 1

A separable flask was charged with 500 grams of a silanol-terminated dimethylpoly-siloxane (average degree of polymerization $n=1\times10$, viscosity: 15 centistokes at 25° C., silanol content: 0.9 mol, low-molecular weight siloxanes $D_3$–$D_{25}$: 654 ppm). The flask was heated at 170° C., 0.01 gram of a 10% paste of potassium hydroxide and dimethylsiloxane gum (10% potassium siliconate) added, and the mixture agitated for 2 hours for polymerization. There was obtained a siloxane gum having a degree of polymerization and a content of low-molecular weight siloxanes ($D_3$–$D_{25}$) as reported in Table 1.

Comparative Example 2

A separable flask was charged with 500 grams of a silanol-terminated dimethylpoly-siloxane (average degree of polymerization $n=7\times10^2$, viscosity: $6.4\times10^3$ centistokes at 25° C., silanol content: 0.01195 mol, low-molecular weight siloxanes $D_3$–$D_{25}$: 654 ppm). The flask was heated at 170° C., 0.01 gram of a 10% paste of potassium hydroxide and dimethylsiloxane gum (10% potassium siliconate ) added, and the mixture agitated for 2 hours for polymerization. There was obtained a siloxane gum having a degree of polymerization and a content of low-molecular weight siloxanes ($D_3$–$D_{25}$) as reported in Table 1.

Comparative Example 3

A separable flask was charged with 500 grams of the silanol-terminated dimethylpoly-siloxane used in Comparative Example 2. The flask was heated at 150° C., 0.01 ml of sulfuric acid added, and the mixture agitated for 4 to 6 hours for polymerization. The results are shown in Table 1.

TABLE 1

|  | Example |  |  |  |  | Comparative Example |  |  |
|---|---|---|---|---|---|---|---|---|
|  | 1 | 2 | 3 | 4 | 5 | 1 | 2 | 3 |
| Raw material | silanol-terminated dimethyl-poly-siloxane | silanol-terminated dimethyl-poly-siloxane | silanol-terminated dimethyl-poly-siloxane | silanol-terminated dimethyl-poly-siloxane | silanol-terminated dimethyl-poly-siloxane | octa-methyl-cyclo-tetra-siloxane | silanol-terminated dimethyl-poly-siloxane | silanol-terminated dimethyl-poly-siloxane |
| Degree of polymerization n | $7\times10^2$ | $6.9\times10^2$ | $1\times10$ | $7\times10^2$ | $7\times10^2$ | $1\times10$ | $7\times10^2$ | $7\times10^2$ |
| Catalyst | bis(dimethylamino)-dimethyl-silane | bis(diethylamino)-dimethyl-silane | bis(diethylamino)-dimethyl-silane | bis-(methylethylamido)-dimethyl-silane | bis(diethylaminoxy)-hexamethyl-tetra-cyclo-siloxane | 10% potassium siliconate | 10% potassium siliconate | sulfuric acid |
| $D_3$–$D_{25}$ in raw material (ppm) | 654 | 329 | 1800 | 1800 | 1800 | 0 | 654 | 1800 |
| Siloxane gum |  |  |  |  |  |  |  |  |
| Degree of polymerization of siloxane gum | $7.3\times10^3$ | $7.4\times10^3$ | $6.8\times10^3$ | $4.2\times10^3$ | $5.6\times10^3$ | $8.2\times10^3$ | $4.2\times10^3$ | $1.9\times10^3$ |
| Low molecular weight siloxane content $D_{3-D_{25}}$ (ppm) | 780 | 504 | 1950 | 4560 | 4982 | 48521 | 39501 | 40520 |

According to the present invention, an organopolysiloxane gum having a minimized content of low-molecular weight siloxanes is readily produced.

Although some preferred embodiments have been described, many modifications and variations may be made thereto in the light of the above teachings. It is therefore to be understood that within the scope of the appended claims, the invention may be practiced otherwise than as specifically described.

We claim:

1. In a process for preparing an organopolysiloxane gum by effecting condensation polymerization of a silanol-terminated organosiloxane of the following formula (1):

wherein $R^1$ and $R^2$ each are a halogen- or cyano-substituted or unsubstituted monovalent hydrocarbon group and letter n is an integer of 2 to 3,000, the improvement comprising adding a silane or siloxane having two hydrolyzable groups in a molecule to said orgnopolysiloxane of formula (1) in such an amount to give a resultant composition having a molar ratio of the silanol groups in said organosiloxane of formula (1) to the hydrolyzable groups in said silane or siloxane of from 0.5 to 3, and condensation polymerizing the resultant composition to form an organopolysiloxane having a high degree of polymerization of at least $1\times10^3$ and a total content of low-molecular weight cyclic siloxanes having from three to 25 monomer units of up to 5,000 parts by weight per million parts by weight of the organopolysiloxane, wherein the silane or siloxane having two hydrolyzable groups in a molecule is selected from the group consisting of the following formulae (3) to (6):

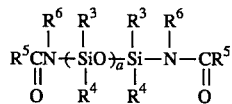   (3)

wherein $R^3$, $R^4$, $R^5$, and $R^6$ are each independently a halogen- or cyano-substituted or unsubstituted monovalent hydrocarbon group, and letter a is a positive number of 0 to 100;

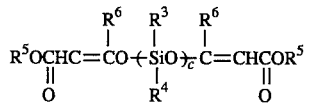   (4)

wherein $R^3$, $R^4$, $R^5$ and $R^6$ are each independently a halogen- or cyano-substituted or unsubstituted monovalent hydrocarbon group and letter c is a positive number of 1 to 100;

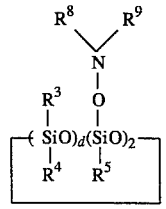   (5)

wherein $R^3$, $R^4$, $R^5$, $R^8$ and $R^9$ are each independently a halogen- or cyano-substituted or unsubstituted monovalent hydrocarbon group arid letter d is an integer of 2 to 10; and

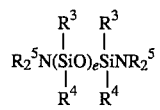   (6)

wherein $R^3$, $R^4$, and $R^5$ are each independently a halogen- or cyano-substituted or unsubstituted monovalent hydrocarbon group and letter e is a positive number of 0 to 1,000.

2. The process of claim 1, wherein the silane or siloxane having two hydrolyzable groups is selected from the group consisting of the following formulae:

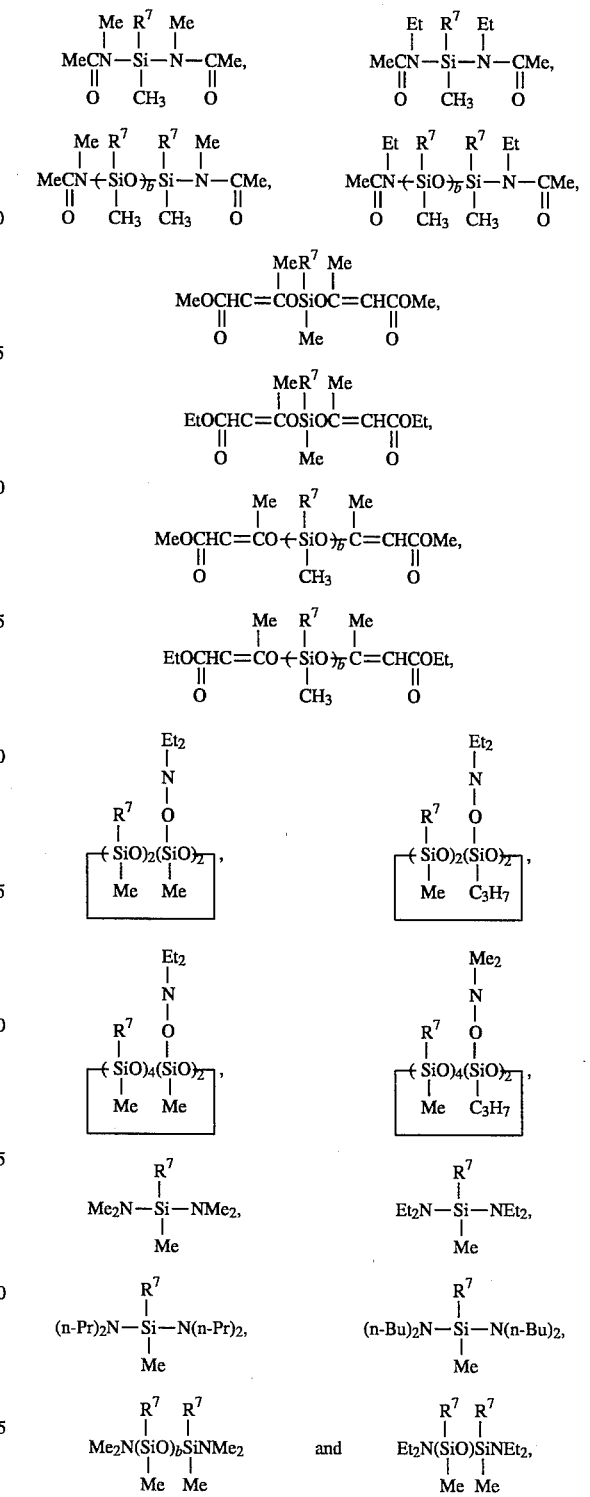

wherein $R^7$ is a methyl, vinyl, trifluoropropyl or phenyl group, Me is methyl, Et is ethyl, Pr is propyl, Bu is butyl, and letter b is an integer of 1 to 100.

3. The process of claim 1, wherein the resultant composition subject to condensation polymerizing consists essentially of the silanol-terminated organosiloxane and the silane or siloxane having two hydrolyzale groups in a molecule.

4. The process of claim 1, wherein low-molecular weight siloxanes are fully removed from the silanol-terminated organosiloxane before the condensation polymerization and the organopolysiloxane product has a total content of low-molecular weight cyclic siloxanes having three to 25 monomer units of less than 2,000 parts by weight per million parts by weight of the organopolysiloxane.

5. The process of claim 1, wherein each of $R^1$–$R^9$ is a hydrocarbon group of 1–10 carbon atoms optionally having hydrogen atoms replaced by halogen atoms or cyano groups.

6. The process of claim 1, wherein the silane or siloxane having two hydrolyzable groups is of the following formula:

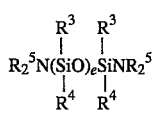  (6)

wherein $R^3$ and $R^4$ are each a halogen- or cyano-substituted or unsubstituted monovalent hydrocarbon group, $R^5$ is a methyl, ethyl or butyl group and the letter e is a number 0 to 10.

7. The process of claim 1, wherein the molar ratio of the silanol groups to the hydrolyzable groups is from 0.8 to 1.5.

8. The process of claim 1, wherein the condensation polymerization temperature is from room temperature to 200° C.

9. The process of claim 1, wherein the organopolysiloxane has a degree of polymerization of at least $5 \times 10^3$.

10. In a process for preparing an organopolysiloxane gum by effecting condensation polymerization of a silanol-terminated organosiloxane of the following formula (1):

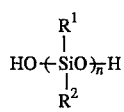  (1)

wherein $R^1$ and $R^2$ each are a halogen- or cyano-substituted or unsubstituted monovalent hydrocarbon group and letter n is an integer of 2 to 3,000, the improvement which comprises adding a silane or siloxane having two hydrolyzable groups in a molecule to said organopolysiloxane of formula (1) in such an amount to give a resultant composition having a molar ratio of the silanol groups in said organosiloxane having a high degree of polymerization of formula (1) to the hydrolyzable groups in said silane or siloxane of from 0.5 to 3, and condensation polymerizing the resultant composition to form an organopolysiloxane having a high degree of polymerization of at least $1 \times 10^3$ and a total content of low-molecular weight cyclic siloxanes having from three to 25 monomer units of up to 5,000 parts by weight per million parts by weight of the organopolysiloxane, wherein the resultant composition subject to the condensation polymerization consists essentially of the silanol-terminated organosiloxane and the silane or siloxane having two hydrolyzable groups.

11. The process of claim 10, wherein the silane or siloxane having two hydrolyzable groups in a molecule is selected from the group consisting of the following formulae (3) to (6):

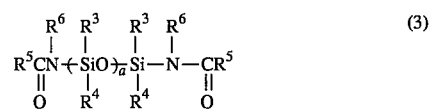  (3)

wherein $R^3$, $R^4$, $R^5$, and $R^6$ are each independently a halogen- or cyano-substituted or unsubstituted monovalent hydrocarbon group, and letter a is a positive number of 0 to 100;

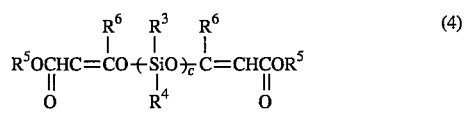  (4)

wherein $R^3$, $R^4$, $R^5$ and $R^6$ are each independently a halogen- or cyano-substituted or unsubstituted monovalent hydrocarbon group and letter c is a positive number of 1 to 100;

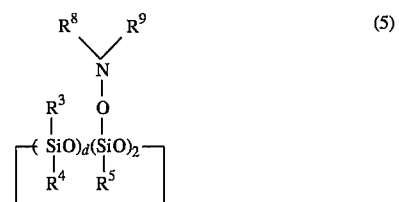  (5)

wherein $R^3$, $R^4$, $R^5$, $R^8$ and $R^9$ are each independently a halogen- or cyano-substituted or unsubstituted monovalent hydrocarbon group and letter d is an integer of 2 to 10; and

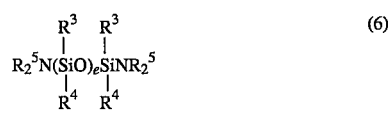  (6)

wherein $R^3$, $R^4$, and $R^5$ are each independently a halogen- or cyano-substituted or unsubstituted monovalent hydrocarbon group and letter e is a positive number of 0 to 1,000.

12. The process of claim 10, wherein the silane or siloxane having two hydrolyzable groups is selected from the group consisting of the following formulae:

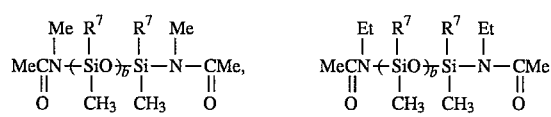

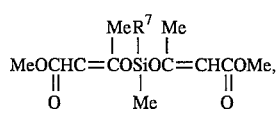

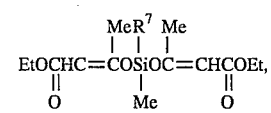

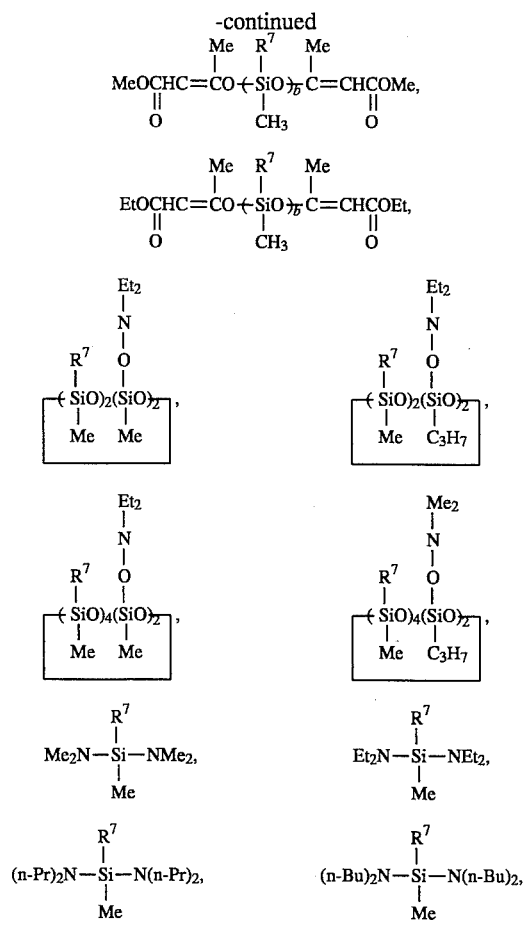

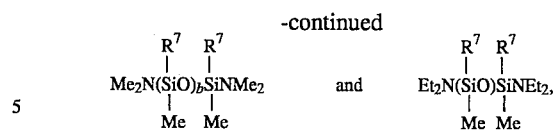

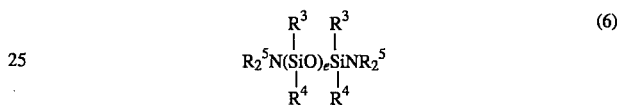

wherein $R^7$ is a methyl, vinyl, trifluoropropyl or phenyl group, Me is methyl, Et is ethyl, Pr is propyl, Bu is butyl, and letter b is an integer of 1 to 100.

13. The process of claim 10, wherein low-molecular weight siloxanes are fully removed from the silanol-terminated organosiloxane before the condensation polymerization and the organopolysiloxane product has a total content of low-molecular weight cyclic siloxanes having three to 25 monomer units of less than 2,000 parts by weight per million parts by weight of the organopolysiloxane.

14. The process of claim 11, wherein each of $R^1$–$R^9$ is a hydrocarbon group of 1–10 carbon atoms optionally substituted by halogen atoms or cyano groups.

15. The process of claim 1, wherein the silane or siloxane having two hydrolyzable groups is of the following formula:

$$R_2^5N(SiO)_e SiNR_2^5 \atop {R^3 \ R^3 \atop R^4 \ R^4}} \tag{6}$$

wherein $R^3$ and $R^4$ are each a halogen- or cyan-substituted or unsubstituted monovalent hydrocarbon group, $R^5$ is a methyl, ethyl or butyl group and the letter e is a number 0 to 10.

16. The process of claim 10, wherein the molar ratio of the silanol groups to the hydrolyzable groups is from 0.8 to 1.5.

17. The process of claim 10, wherein the condensation polymerization temperature is from room temperature to 200° C.

18. The process of claim 10, wherein the organopolysiloxane has a degree of polymerization of at least $5\times10^3$.

\* \* \* \* \*